(12) United States Patent
Winkelmann et al.

(10) Patent No.: US 6,244,409 B1
(45) Date of Patent: Jun. 12, 2001

(54) SLAVE CYLINDER FOR A CENTERED CLUTCH RELEASE SYSTEM

(75) Inventors: Ludwig Winkelmann, Erlangen; Gerhard Meyer, Lehrberg; Bernd Liebezeit, Oberreichenbach; Gerhard Prosch, Höchstadt/Aisch, all of (DE)

(73) Assignee: LuK Lamellen und Kupplungsbau GmbH

( * ) Notice: Subject to any disclaimer, the term of this patent is extended or adjusted under 35 U.S.C. 154(b) by 0 days.

(21) Appl. No.: 09/422,385

(22) Filed: Oct. 21, 1999

(30) Foreign Application Priority Data

Oct. 29, 1998 (DE) .............................. 198 49 850

(51) Int. Cl.$^7$ .................................. F16D 25/08
(52) U.S. Cl. ................. 192/85 CA; 192/91 A; 92/107; 92/169.1; 277/437; 277/439
(58) Field of Search ............................ 192/85 CA, 91 A; 92/107, 169.1, 170.1; 277/437, 439, 559

(56) References Cited

U.S. PATENT DOCUMENTS

| | | | |
|---|---|---|---|
| 3,572,730 | * | 3/1971 | Otto et al. ......................... 277/559 X |
| 3,586,340 | * | 6/1971 | Otto et al. ......................... 277/559 X |
| 4,573,690 | * | 3/1986 | DeHart et al. .................... 277/559 X |
| 4,577,549 | * | 3/1986 | Frank et al. ........................ 92/169.1 |
| 4,821,627 | * | 4/1989 | Leigh-Monstevens et al. ....... 92/107 |
| 5,287,951 | * | 2/1994 | Voit et al. ....................... 192/85 CA |
| 5,908,097 | * | 6/1999 | Grosspietsch et al. ............ 192/91 A |
| 5,988,340 | * | 11/1999 | Riess ............................... 192/91 A X |

* cited by examiner

Primary Examiner—Richard M. Lorence
(74) Attorney, Agent, or Firm—Darby & Darby

(57) ABSTRACT

A hydraulically operated central release unit for a motor vehicle clutch is designed as a slave cylinder that is arranged inside a clutch housing. The central release unit includes a housing in which a ring piston is movably guided. The ring piston has a groove ring seal with lips sealingly contacting the sealing tracks. To reduce the wear on the sealing lips and to avoid squeaking noises of the groove ring seal, the surfaces of the sealing tracks are provided with micro cavities.

26 Claims, 4 Drawing Sheets

SLAVE CYLINDER FOR A CENTERED CLUTCH RELEASE SYSTEM

The present invention relates to an hydraulically operated release system for a motor vehicle clutch.

A slave cylinder, which can also be called a central release unit, is mounted inside a clutch housing and concentrically surrounds a drive shaft which connects an internal combustion engine to a gearshift transmission. The central release unit comprises a housing in which a ring piston is axially displaceable. The ring piston axially defines a pressure chamber and is guided and sealed between an outer sleeve and an inner guide sleeve. The housing which is made of plastics is provided with an integral radially aligned pressure pipe which is guided through an opening in the clutch housing and through which the central release unit can be biased with a pressurised fluid. A hydraulic pipe attachable to the pressure pipe leads to a master cylinder which is connected indirectly or directly to a pedal device mounted in the passenger cell of the vehicle. The hydraulic release system is activated by manually operating the clutch pedal.

Furthermore the sealing track or guide track in the outer sleeve and guide sleeve of the housing can be formed so that these reduce sealing friction and at the same time lead to a reduction in noise when operating the release device.

Various solutions have been proposed to design the sealing track on the outer sleeve and guide sleeve of a slave cylinder housing made from plastics.

DE 43 31 728 A1 discloses a central release unit whose housing is made from a fibre glass reinforced material on a resin base. The entire surface of the housing is nickel-plated in order to improve in particular the sliding properties of the sealing element on the walls defining the pressure chamber. A high bearing proportion of the sealing lips which can be achieved through a smooth flat surface produces a lower sealing leakage. Against this advantage however is increased sealing friction. The high bearing proportion causes at the same time a so-called stick-slip effects i.e. a squeaking noise of the sealing lips of the sealing element. Applying the nickel coating requires a separate work process which impairs, i.e. extends, the production run, and at the same time considerably increases the manufacturing costs.

DE 42 29 370 A1 describes a further slave cylinder made from plastics. This central release unit is provided with relatively large wall thickness which increases the structural space required. The housing is provided with an integral short pressure pipe for connecting the hydraulic pipe. The drawback with this known solution is a pipe connection located in the clutch housing and which in the event of a possible break in the tightness needs a great deal of expense to remove the leak. Furthermore the seal is guided on an untreated guide or sealing track of the outer sleeve or guide sleeve of the housing. This sealing guide results in increased wear on the sealing lips and leads to premature breakdown of the slave cylinder.

Based on the technical faults of known solutions the object of the invention is to improve the rigidity of the component parts for the housing of the slave cylinder made from plastics and to provide measures to reduce the noise and wear of the seal.

This is achieved according to the invention through a plastics housing which is made as an injection moulded part. The injection moulding tool used for production ensures that when manufacturing the housing a structured sealing track or guide track is produced for the sealing lips of the sealing element which is formed as a grooved sealing ring. The sealing track according to the invention thus has a surface structure which is neither too flat and smooth nor has an unacceptably high roughness. Rather this surface condition represents an optimum compromise between a sealing leak and a bearing portion of the sealing lips and thus allows minimum wear on the sealing lips and reduced noise development of the groove ring seal.

According to the invention the sealing tracks of the housing have micro cavities in a texture, with a desired irregularly defined surface structure. The texture thereby forms sealing tracks having lubricating pockets in which the hydraulic fluid, i.e. the brake fluid, can be deposited and thus improve the sliding process of the seal. At the same time the surface structure according to the invention avoids the detrimental stick-slip effect and thus reduces the sealing lip wear of the groove ring seal.

The surface structure according to the invention consequently makes it possible to produce a housing provided with optimised sealing tracks for the sealing element without any further work process. The measures according to the invention lead to a clear increase in the service life and stability of the groove ring seal and thus of the entire slave cylinder.

Further developments of the invention are the subject of claims 2 to 23.

According to an advantageous further development of the invention it is proposed to form the micro cavities of the sealing tracks in the form of rounded surface topology which on an enlarged scale matches the outer contour of a golf ball. A rounded topology formed in this way on the one hand has an advantageous effect on the wear of the sealing lips and on the other improves the bearing proportion of the sealing element and reduces or eliminates the development of noise through the sealing lips.

As a further measure for improving the sliding properties of the sealing track provided with the micro cavities it is proposed to provide the tracks with deposits serving as sliding improvement means. PTFE can preferably be used as sliding improvement means which can be embedded by way of example in the form of threads disc like or coil like in the sealing track.

To improve the sliding guide the invention further includes a ring piston having sliding improvement means incorporated in the sleeve face and/or bore wall. On the one hand the wear of the sealing track on the outside sleeve is reduced and on the other the friction between the ring piston and the outer sleeve and thus the required displacement force when operating the central release unit. $MoS_2$ is used for example as the sliding improvement means.

A further design of the invention provides a two-part housing. An outer sleeve or guide sleeve which is prefabricated separately is connected non-detachably to the housing to make up the central release unit. It is thereby advantageous to fix the outer sleeve or guide sleeve non-detachably on the housing by ultrasound welding or adhesive The two-part design allows an advantageous shortened axial structural space for the central release unit. Furthermore the two-part construction of the housing extends the piston stroke as a result of an axially off-set arrangement of the pressurised medium supply in the pressure chamber.

Furthermore the inventive idea comprises an outwardly moulded taper of the outer sleeve from the pressure housing of at least 0.5°. The outwardly moulded taper is thereby formed so that the largest diameter of the outer sleeve is provided on the release bearing side and the internal width of the sealing track on the outer sleeve tapers continuously over the entire length of the outer sleeve. Since as the wear on the follower disc of the friction clutch increases so the neutral position of the piston is moved in the direction of the gearbox and the piston seal is also subjected to a certain wear, the outwardly moulded taper according to the invention ensures that the wear on the piston seal is compensated The reduction in diameter produced by the moulded-out taper thus compensates sealing lip wear of the piston seal and thereby causes a practically constant contact pressure of the outer sealing lip of the piston seal. Consequently an improved service life of the seal is achieved as a result of the practically constant contact pressure force over the useful life of the friction clutch which effectively eliminates the risk of leaks.

As an alternative the invention includes a guide sleeve having an outwardly moulded taper whose sealing track runs in reverse to the sealing track of the outer sleeve, i.e. on the side of the release bearing the guide sleeve has the smallest outer diameter which is increased continuously up to the side of the gearbox. This shape for the guide sleeve likewise ensures a constant contact pressure force of the inner sealing lip of the piston seal over the useful life of the release system. Furthermore it is proposed according to the invention that both the outer sleeve and the guide sleeve are provided with an outwardly moulded taper which are formed oppositely to each other to ensure a constant contact pressure force of the inner and outer sealing lip of the piston seal.

According to the invention the outwardly moulded taper, i.e. the cone angle of the outwardly moulded taper from the sealing track is advantageously designed in dependence on the shaping of the pocket-like micro cavities. The depth or length of these micro cavities is thereby chosen so that no or only a slight rear cut section is formed and the outwardly moulded area is not obstructed. The maximum depth for the rear cut section is $\leq \frac{1}{3}$ of the cavity depth.

According to the invention it is proposed to make the micro cavities preferably rectangular or elliptical. Where necessary the micro cavities can obviously also be formed in all other geometrical shapes.

According to an advantageous design of the invention it is proposed to make the housing of the central release unit from a high-tensile temperature resistant plastics. Duroplastics or thermosetting plastics are particularly suitable for this. The invention further proposes a fibre glass reinforced plastics such as for example PA 66 GF which is characterised by a particularly high strength.

According to a further feature of the invention the central release unit according to the invention comprises a housing and a ring piston which also allow different materials to be paired with each other. A choice of materials is thereby provided which during operation and the heat expansions connected therewith do not impair the sealing function of the piston ring seal. The choice of materials preferably includes materials having the same coefficient of expansion.

As a supporting measure for improving the stiffness of the housing the housing can be provided according to the invention with a reinforcement.

It has proved advantageous for this to provide the housing with a reinforcement made without stock removal and fixed by keyed or force locking engagement on the housing.

To optimise manufacturing costs the reinforcement according to the invention can be arranged within the scope of an injection moulding process on corresponding outer areas of the housing and be connected to same. For this is used in particular a light arc injection process with which the reinforcement can be applied to the sleeve face of the housing preferably in the area of the pressure chamber. The light arc injection process also allows the reinforcement to be set integrated in the wall thickness.

The invention further proposes sealing tracks of aluminium or aluminium alloy which are applied onto the foundation body in conjunction with a chemical or electro-chemical finishing process. An aluminium spray-on process or electro-metal spray process are particularly suited to this.

The sealing track can furthermore be formed according to the invention by an inter-metal connection or by a dispersion layer.

A further alternative proposes that at least one foundation body forming a sealing track is made from a material which cannot be galvanised. Furthermore the invention proposes a plastics which can be galvanised as the material for the foundation body forming a sealing track.

In order to obtain a sealing track having an optimised wear protection layer it is proposed according to the invention to coat the sealing track by way of example with Dynamand or PVT.

Embodiments of the Invention are shown in the drawings which will now be described in further detail.

Figure 1:
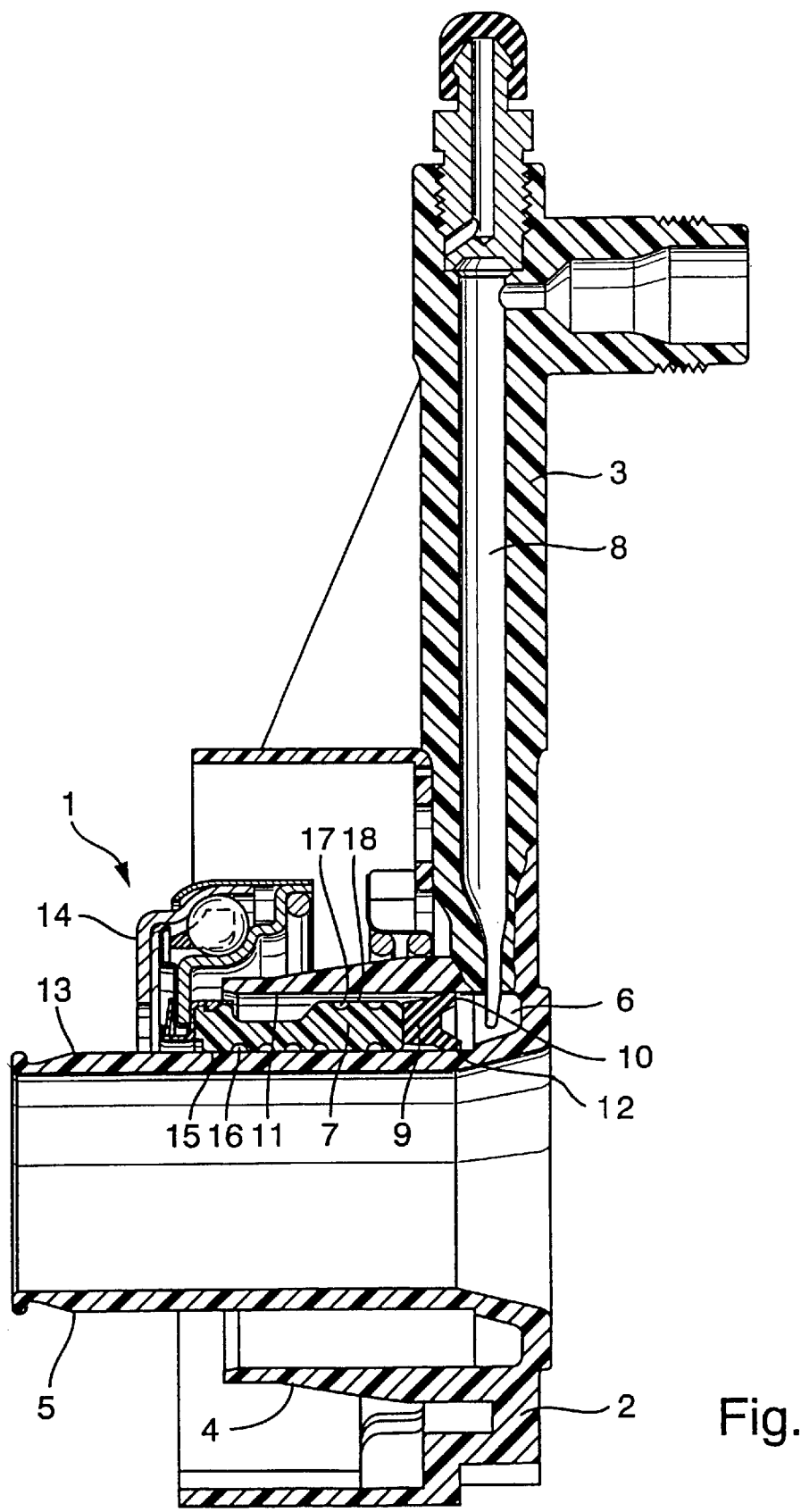
FIG. 1 shows a semi-sectional view of a central release unit which comprises a housing according to the invention.

FIG. 1 shows a hydraulically operated central release unit 1 in the form of a slave cylinder. This comprises a housing 2 made of a high temperature resistant plastics, preferably a thermosetting or duroplastics. A pressure pipe 3 as well as an outer sleeve 4 and guide sleeve 5 are moulded integral on the housing 2 which is formed as an injection moulded part. The guide sleeve 5 will be positioned concentrically around a drive shaft (not shown) which connects an internal combustion engine to a shift transmission. The housing 2 is detachably fixed on a gearbox housing (likewise not shown). The outer sleeve 4 and guide sleeve 5 which are radially spaced from each other define a pressure chamber 6 in which a ring piston 7 is longitudinally displaceably mounted The pressure chamber 6 can be biased with a pressurised medium through a supply bore 8 formed in the pressure pipe 3 To seal the pressure chamber 6 on the piston side the ring piston 7 is provided with a groove ring seal 9 whose radially outer sealing lip 10 sealingly adjoins a sealing track 11 of the outer sleeve 4. The radially inner sealing lip 12 is sealingly supported against the sealing track 13 of the guide sleeve 5. At the end remote from the groove ring seal 9 the ring piston 7 is provided with a release bearing 14 which in the installed state of the central release unit 1 interacts with a friction clutch (not shown).

In order to prevent noise from developing during displacement of the ring piston 7, i.e. during operation of the central release unit 1 the sealing tracks 11, 13 according to the invention have a surface structure which comprise micro cavities in the form of irregularly rounded surface topology. These sealing tracks 11, 13 which are formed without any secondary finishing in the manufacturing process of the housing 2 are formed for example by special roughened areas of the injection moulding tool and produce micro cavities in a texture which on an enlarged scale can match the outer contour of a golf ball. During operation this surface structure on the sealing tracks 11, 13 forms lubricating pockets for the pressurised fluid, i.e. the brake fluid and thus improves the sliding process of the sealing lips 10, 12. Thus at the same time a stick-slip effect and squeaking of the sealing lips 10, 12 is avoided, connected with a reduced sealing lip wear.

As a further measure for avoiding any possible squeaking noises the ring piston 7 is provided on the bore wall 15 with sliding improvement means 16. Sliding improvement means 16 can preferably be provided by PTFE deposits which are provided in a helix or randomly distributed in the bore wall 15 of the ring piston 7. As an alternative or in addition sliding improvement means 16, 17 are incorporated in the sleeve face 18 and the bore wall 15 of the ring piston 7 in order to optimise the guide of the groove ring seal 9.

Figure 2:
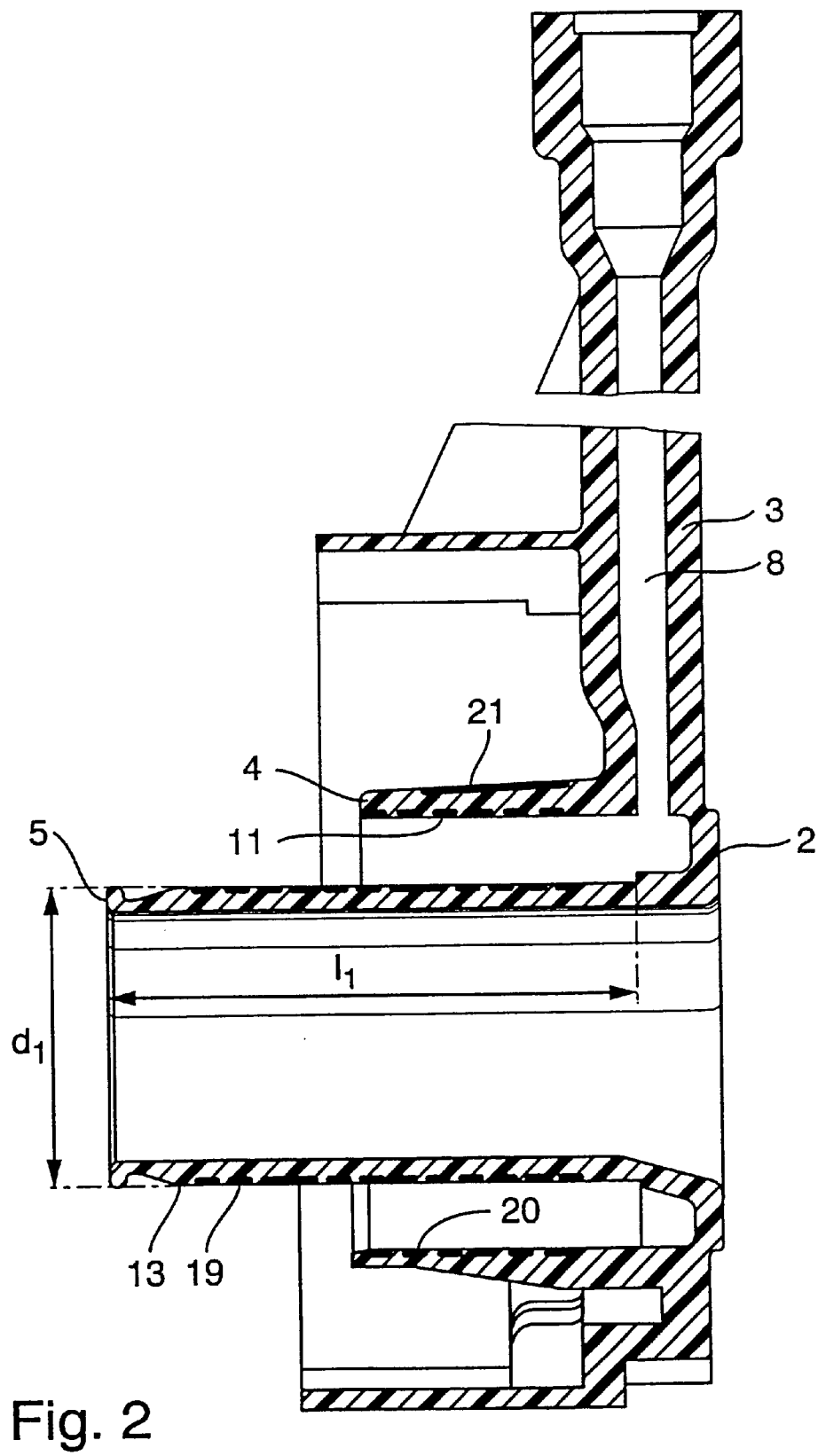
FIG. 2 shows a detailed part of the housing of the central release unit illustrated in FIG. 1.

FIG. 2 shows the housing 2 as an individual part. To compensate wear on the sealing lip the guide sleeve 5 is provided with an outwardly moulded taper whose angle is preferably 0.5°. The smallest diameter '$d_1$' is provided accordingly at the free end of the guide sleeve 5. The size of the diameter thereby increases starting from the smallest diameter '$d_1$' continuously over the length '$l_1$'. This path of the outwardly moulded taper makes it possible to compensate the wear on the groove ring seal 9, more particularly its sealing lip 12, since as the wear on the follower disc of the friction clutch increases so the neutral position of the ring piston 7 is shifted towards the gearbox housing which leads to reduced contact pressure force of the sealing lip 12. As a result of the outwardly moulded taper the decreasing contact pressure force is equalised by the continuous enlargement of the diameter of the guide sleeve 5.

According to FIG. 2 the housing 2 furthermore has measures for avoiding squeaking noises. To this end both the guide sleeve 5 and the outer sleeve 4 are provided with sliding improvement means 19, 20 which are embedded in the relevant sealing track 11, 13. The outer sleeve 4 is provided with a reinforcement 21 to strengthen the housing 2. This reinforcement 21 effectively prevents the outer sleeve 4 from expanding radially during operation of the central release unit 1, i.e. when the pressure chamber 6 is loaded with pressure. As reinforcement 21 can be used a sheet metal sleeve, made without stock removal, which can be fixed with force locking engagement on the sleeve face of the outer sleeve 4 by a press-fit or shrink-fit. Furthermore a round wire or other profiled wire can be used as the reinforcement which is wound onto the sleeve face of the outer sleeve 4 free of play and bridging tolerances.

As an alternative the reinforcement can be applied to or integrated in the corresponding outer areas of the housing 2, i.e. more particularly the outer sleeve 4, by arc spraying.

Figure 3:
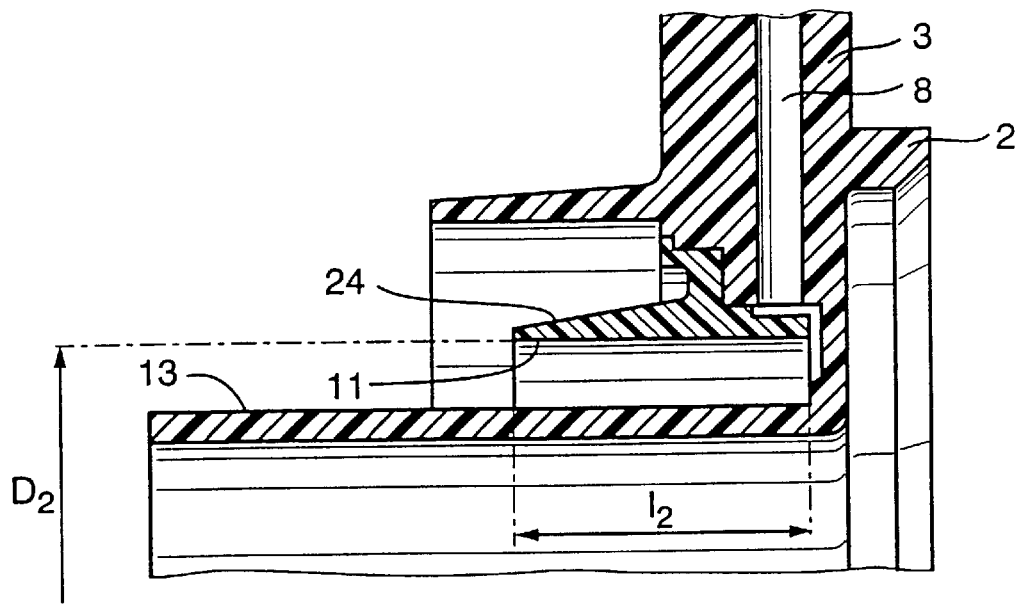
FIG. 3 is a sectional view of the housing shown in FIG. 2 wherein the outer sleeve is connected as a separate part in keyed engagement with the housing.

FIG. 3 shows the housing 2 in which the outer sleeve 24 is inserted which has been prefabricated as a separate component part. To this end the outer sleeve 24 has a stepped outer contour which matches a corresponding socket in the housing 2 to achieve an increased contact surface area with which the outer sleeve 24 can be non-detachably fixed in the housing, preferably by ultrasound welding or adhesive. A two-part housing 2 formed in this way makes it possible to provide an outwardly moulded taper for the sealing track 11 of the outer sleeve 24. In the installed state of the outer sleeve 24 the inner diameter tapers continuously, starting from the diameter '$D_2$' over the length '$l_2$'. In association with this the contact pressure force of the sealing lip 10 is increased corresponding to the displacement of the ring piston 7 towards the gearbox housing which is conditioned by the wear of the follower disc of the friction clutch.

According to the invention an outwardly moulded taper can be provided on the guide sleeve 5 (FIG. 2) or the outer sleeve 24 (according to FIG. 3). As an alternative the invention likewise includes matching outwardly moulded tapers on both the guide sleeve 5 and outer sleeve 24.

Figure 4:
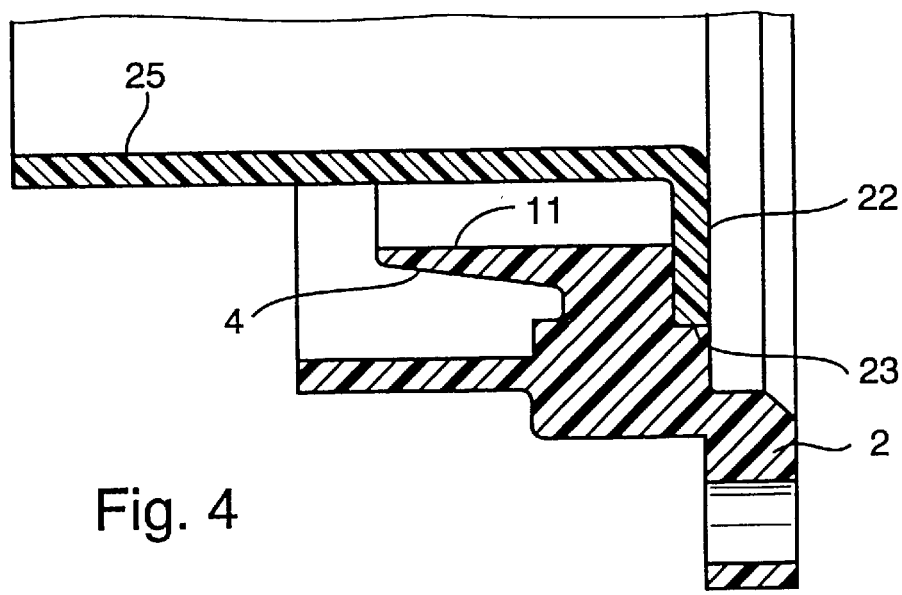
FIG. 4 shows a further sectional view of the housing according to FIG. 2 with a guide sleeve which is inserted as a separate component part into the housing.

FIG. 4 shows an alternative form of a two-part housing 2. Here a separately prefabricated guide sleeve 25 is provided which is fitted by a ring flange 22 at the end into a recess 23 at the end of the housing 2 and is likewise fixed non-detachable preferably by ultrasound welding.

By using a separately made outer sleeve 24 or a guide sleeve 25 the structural space of the housing 2 can be better utilised since this construction allows an extended guide of the ring piston 7 and thus an extended piston stroke. When retaining the piston stroke according to the solution illustrated in FIG. 1 a shortened axial structural space of the housing 2 is advantageously achieved.

Figure 5:
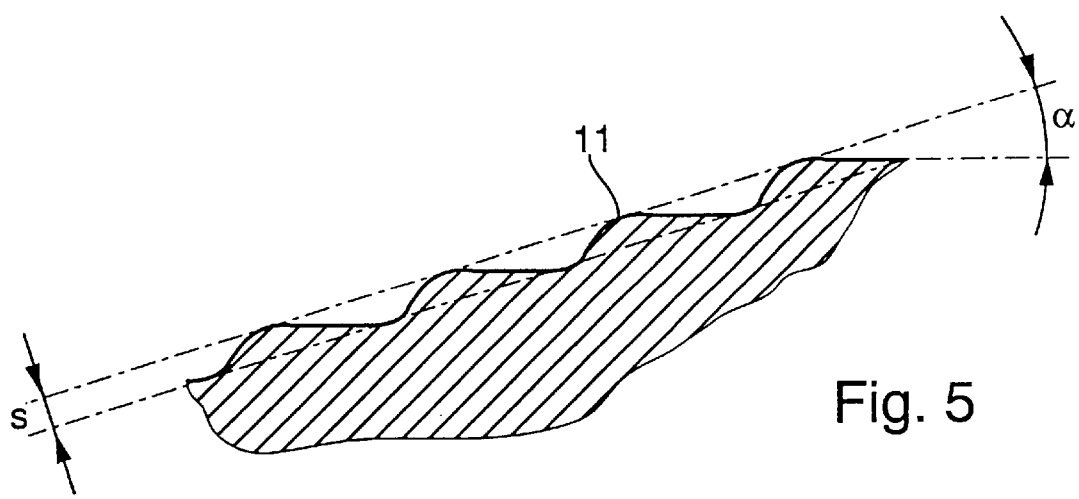
FIG. 5 shows in an enlarged sectional view the surface structure of the sealing track.

FIG. 5 shows a section of the sealing track 11 which is mounted with an outwardly moulded taper running at an angle $\alpha a$. The enlarged illustration shows the shaping of the micro cavities. The wavy surface structure with a cavity depth 'S' is thus formed so that in the area of the cavities there are no rear-cut sections which could impede the formation of the sealing track 10. A surface structure of this kind is likewise offered for a sealing track 13 provided with an outwardly moulded taper.

Figure 6:
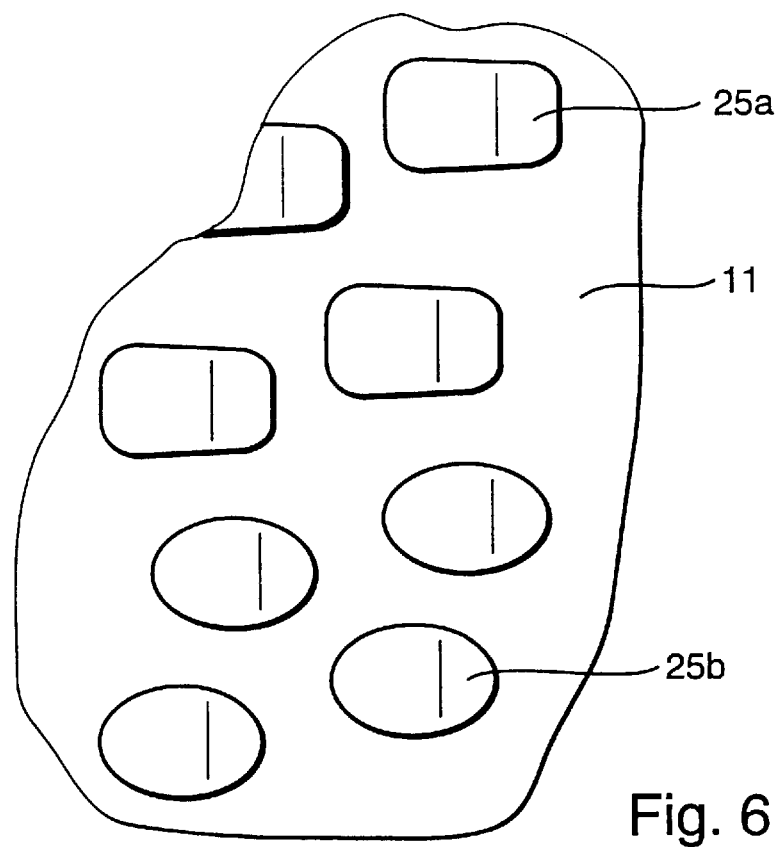
FIG. 6 shows differently shaped micro cavities on an enlarged scale in plan view of the sealing track.

The sealing track 11 provided with micro cavities is shown in plan view in FIG. 6. According to this the structured surface of the sealing track 11, ie provided with micro cavities, can have geometrically different shaped cavities. According to FIG. 6 substantially rectangular shaped cavities 25a are provided in the upper area of the drawing. In the lower area of FIG. 6 the cavities 25b are shown elliptical as an alternative. The invention includes both cavities of alternate different shape and also a sealing track 11, 13 having uniformly shaped cavities. As an alternative to the geometric shapes illustrated in FIG. 6 the invention includes additional shapings of any kind.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Hydraulically operated central release unit for a motor vehicle clutch, comprising a housing made of a plastic material by an injection molding process, wherein the housing forms a ring-shaped pressure chamber with a radially exterior outside sleeve and a radially interior guide sleeve receiving an axially movable ring piston, wherein a groove ring seal with sealing lips is arranged at a frontal end of the ring piston facing the pressure chamber with the sealing lips sealingly adjoining a sealing track of the outside sleeve as well as a sealing track of the guide sleeve, and wherein at least one sealing track is provided with micro-cavities that are produced in the sealing track during the injection molding process.

2. Central release unit according to claim 1 wherein the sealing tracks of the housing have micro cavities with a rounded surface topology.

3. Central release unit according to claim 1 wherein sliding improvement means are incorporated in the sealing tracks of the housing.

4. Central release unit according to claim 1 wherein sliding improvement means are incorporated in a sleeve face or in a bore wall of the ring piston.

5. Central release unit according to claim 3 or 4 wherein PTFE is embedded as the sliding improvement means in the sealing tracks of the housing or in a bore wall and/or in a sleeve face of the ring piston.

6. Central release unit according to claim 5 having sliding improvement means which are arranged spaced from each other disc-like or coaxial with the longitudinal axis of the central release unit in the housing or in the ring piston.

7. Central release unit according to claim 1 having a two-part housing whose outer sleeve and guide sleeve which are prefabricated separately are non-detachably connected to the housing to make up the central release unit.

8. Central release unit according to claim 1 wherein at least one sealing track or the outer sleeve or guide sleeve is formed as a cone.

9. Central release unit according to claim 8 wherein the outer sleeve has in the area of the sealing track an outwardly moulded taper of 0.5°.

10. Central release unit according to claim 8 having a sealing track of the guide sleeve whose outwardly moulded taper amounts to 0.5°.

11. Central release unit according to claim 8 wherein a cone angle is designed in dependence on the shaping, more particularly on a depth 's' of the pocket-like micro cavities.

12. Central release unit according to claim 11 wherein a measurement $\leq \frac{1}{3}$ of the maximum cavity depth 's' is provided for the undercut section of the micro cavities.

13. Central release unit according to claim 1, wherein the micro cavities are of a rectangular or elliptical shape.

14. central release unit according to claim 1, wherein the plastic material is a high-tensile, temperature resistant material selected from the group consisting of duroplastics, thermosetting plastics and fibre-glass reinforced plastics.

15. Central release unit according to claim 14, wherein said plastic material is a fibre-glass reinforced plastic material.

16. Central release unit according to claim 1 wherein materials having substantially the same coefficient of expansion are selected for the ring piston and for the housing.

17. Central release unit according to claim 1 which is provided with a reinforcement to improve the rigidity of the housing in the area of the pressure chamber.

18. Central release unit accordion to claim 17 wherein a reinforcement made without stock removal encloses the outer sleeve with force locking engagement.

19. Central release unit according to claim 17 wherein the reinforcement is produced by means of an arc spraying process and is connected to the housing or to a component part belonging to the housing.

20. Central release unit according to claim 1, wherein a material comprising aluminium is applied to at least one sealing track in conjunction with a chemical or electro-chemical finishing process.

21. Central release unit according to claim 1 wherein at least one sealing track is formed by an intermetal connection or by a dispersion layer.

22. Central release unit according to claim 1 wherein at least one foundation body forming the sealing track is made from a material which cannot be galvanised.

23. Central release unit according to claim 1 wherein a plastics which can be galvanised is provided as the material for at lest one foundation body forming the sealing track.

24. Central release unit according to claim 1 wherein at least one sealing track is coated with an anti-wear layer.

25. Central release unit according to claim 24, wherein the anti-wear layer comprises a material selected from the group consisting of Dynamand and PVD.

26. Hydraulically operated central release unit for a motor vehicle clutch, comprising a housing made of a plastic material by an injection molding process, wherein part of the housing forms a slave-cylinder pressure chamber in which a ring piston is displaceably guided, the pressure chamber has wall surfaces with micro cavities, said micro cavities being produced during the injection molding process, and the ring piston has a seal with sealing lips that make sealing contact with the wall surfaces that have micro cavities.

\* \* \* \* \*